United States Patent [19]

Huber

[11] Patent Number: 4,962,709

[45] Date of Patent: Oct. 16, 1990

[54] AUXILIARY VEHICLE DECK

[76] Inventor: Roy L. Huber, 11609 Lehigh Ct., Plymouth, Mich. 48170

[21] Appl. No.: 259,052

[22] Filed: Oct. 18, 1988

[51] Int. Cl.⁵ .............................................. A47B 23/00
[52] U.S. Cl. ......................................... 108/44; 108/27
[58] Field of Search ................... 108/44, 27, 42, 51.3, 108/1-7, 15; 224/42.32, 42.42, 42.43, 42.44, 42.45 R; 5/3, 2 R, 94, 401, 414; 296/37.16, 65.1; 248/507, 508, 500, 316.1, 229

[56] References Cited

U.S. PATENT DOCUMENTS

| | | | |
|---|---|---|---|
| 589,715 | 9/1897 | Goodwin | 108/44 |
| 2,493,170 | 1/1950 | Stiff et al. | 5/94 X |
| 2,705,820 | 4/1955 | Torrence | 108/27 X |
| 2,717,187 | 9/1955 | Morgan et al. | 108/27 X |
| 2,926,361 | 3/1960 | Hornik | 108/27 X |
| 2,932,544 | 4/1960 | Lambert | 108/44 X |
| 2,976,914 | 3/1961 | Miller | 297/DIG. 6 X |
| 3,110,429 | 11/1963 | Philips | 108/44 X |
| 3,118,150 | 1/1964 | Izzo | 5/94 X |
| 3,587,479 | 6/1971 | Geschwender | 108/51.3 |
| 3,982,057 | 9/1976 | Briggs et al. | 108/51.3 X |
| 4,232,413 | 11/1980 | Mongault | 5/94 |
| 4,319,530 | 3/1982 | Moog | 108/51.3 |
| 4,726,083 | 2/1988 | Hoshall | 297/DIG. 6 X |

Primary Examiner—José V. Chen
Attorney, Agent, or Firm—Alex Rhodes

[57] ABSTRACT

A lightweight auxiliary deck for utility, recreational and conventional passenger vehicles comprising a rectangular laminated deck having thin upper and lower sheets, a peripheral wall adjoining the sheets, an inner rigid cellular core and an outer resilient molding. A resilient cushion is detachably retained to the upper surface of the deck. In the first aspect the deck is installed in a vehicle with the vehicle's rear seat removed and has a pair of foldable tubular legs attached to the lower surface of the deck which are rotatably adjustable outwardly to an operative position for supporting the deck and inwardly toward the deck to a position in bearing relationship to the deck for storing the deck and a structure for securing the legs to a vehicle floor. In the second aspect the deck is installed in a vehicle with the rear seat in place and has a single foldable tubular leg attached to the lower surface of the deck which is rotatably adjustable outwardly to an operative position for supporting the deck and inwardly toward the deck to a position in bearing relationship to the deck for storing the deck.

10 Claims, 2 Drawing Sheets

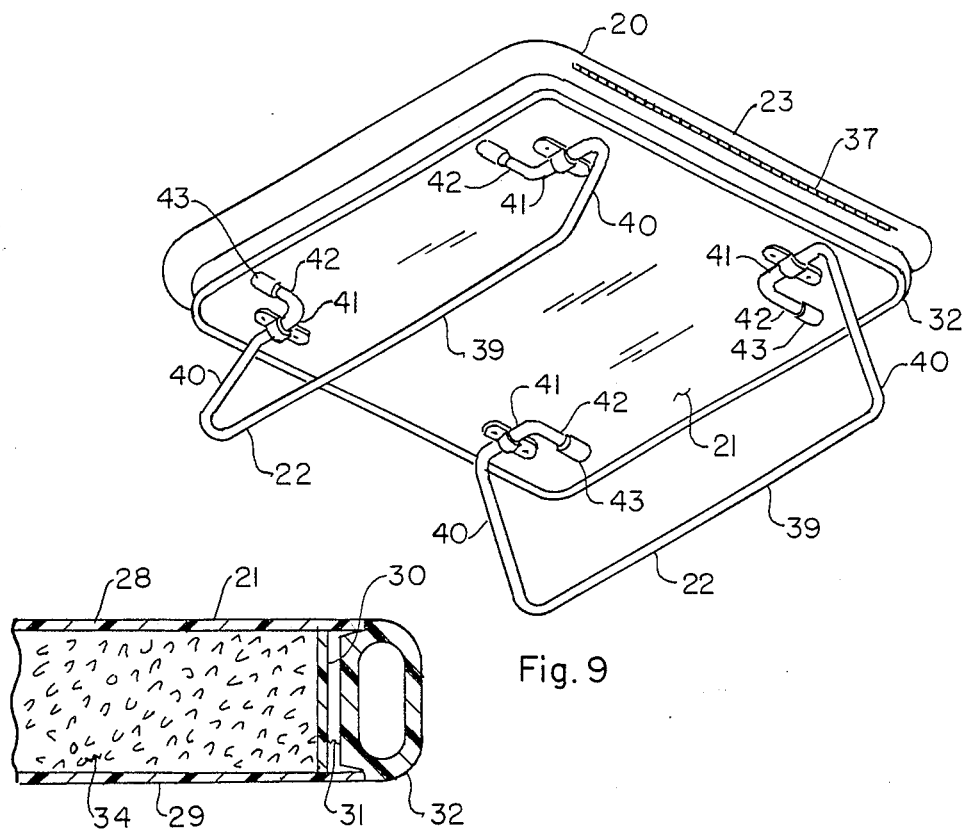
Fig. 9
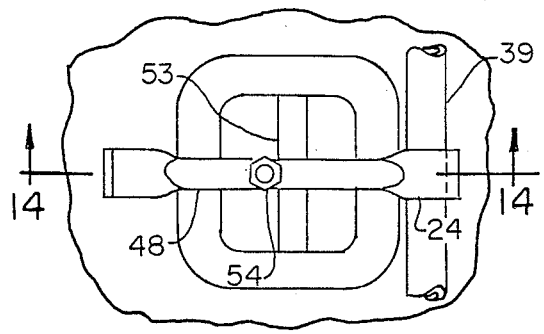
Fig. 10
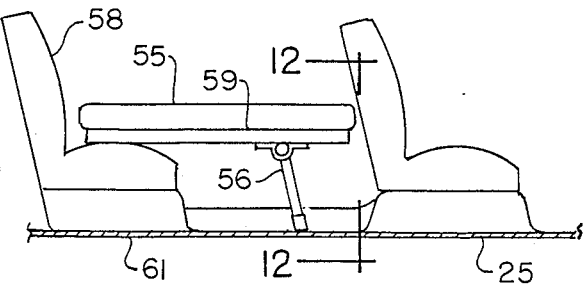
Fig. 11
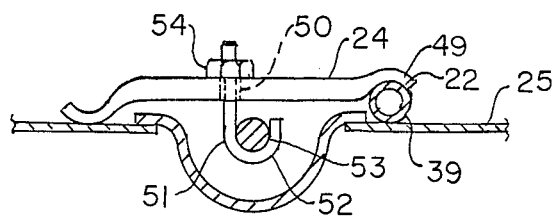
Fig. 13
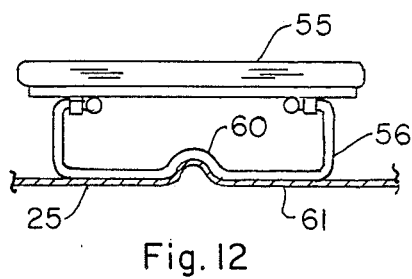
Fig. 12
Fig. 14

AUXILIARY VEHICLE DECK

BACKGROUND OF THE INVENTION

This invention relates to vehicle decks and more particularly to a lightweight auxiliary deck for sleeping and transporting articles in utility and recreational vehicles. These vehicles have large cargo areas which are under utilized because of an inability to adapt the area to a user's needs.

One aspect of the current practice is that valuable objects in the cargo areas are subject to theft because they are exposed to view through the windows of the vehicles. Another aspect of the current practice is that many vehicle occupants, such as sportsmen and highway travelers, desire to sleep in these areas but are discouraged from doing so because of a lack of a comfortable sleeping platform.

SUMMARY OF THE INVENTION

The present invention is a lightweight auxiliary deck for utility, recreational and conventional passenger vehicles, by way of example, jeeps, vans, station wagons and sedans. The invention comprises a lightweight laminated deck, a pair of foldable legs rotatably attached to the lower surface of the deck, and a means for securing the legs to a vehicle floor. An upholstered resilient cushion is detachably joined to the upper surface of the deck.

In one aspect of the invention, the deck is installed in a vehicle's rear cargo area with the rear seat removed and the legs are fastened to the vehicle's floor. In another aspect of the invention, the deck is installed with the rear seat in place between the front and rear seats.

It is a primary object of the present invention to provide a compact, lightweight sleeping deck with foldable legs for highway travelers and sportsmen which can be easily and quickly installed and removed from a motor vehicle.

It is another object, in addition to the foregoing object, to provide an auxiliary motor vehicle deck fastened to a vehicle's floor to prevent movement of the deck while the vehicle is in motion.

It is another object, in addition to the foregoing objects, to provide a means for transporting articles out of view in utility and recreational vehicles.

It is another object, in addition to the foregoing objects, to provide an auxiliary vehicle deck which can be used as a shelf for transporting articles.

Other objects, features and benefits of the invention will be apparent from the ensuing description and accompanying drawings which describe the invention in detail.

BRIEF DESCRIPTION OF THE DRAWINGS

FIG. 9 is a perspective view of the invention.

FIG. 10 is an enlarged partial cross-sectional view taken on the line 10—10 of FIG. 6 excluding legs 22.

FIG. 11 is an alternate embodiment of the present invention.

FIG. 12 is a front view of the embodiment shown in FIG. 11.

FIG. 13 is an enlarged front view of a bracket assembly for attaching the deck of FIG. 1 to a vehicle floor.

FIG. 14 is a cross-sectional view taken on the line 14—14 of FIG. 13.

DETAILED DESCRIPTION OF THE PREFERRED EMBODIMENT

Figure 1:
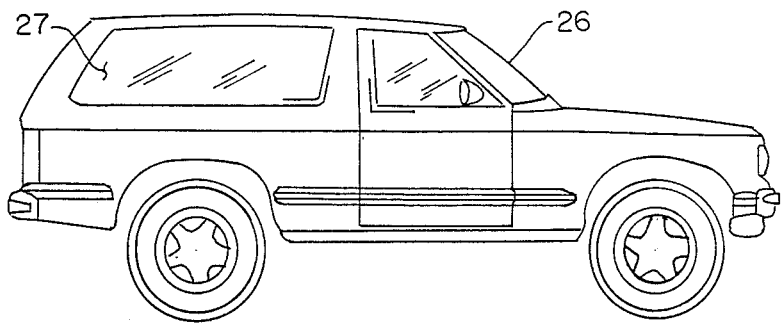
FIG. 1 is a side view of a vehicle.
Figure 3:
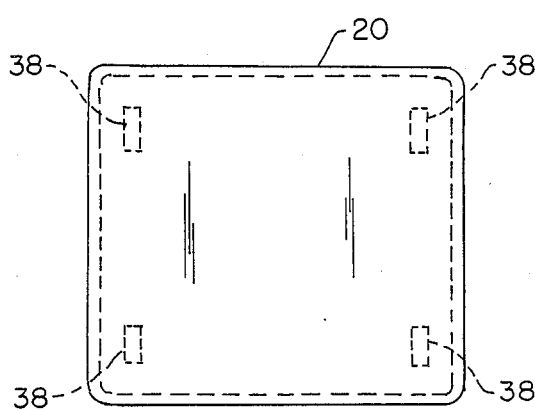
FIG. 3 is a plan view of the deck.

Referring now to the drawings wherein like numerals designate like and corresponding parts throughout the several views, the auxiliary vehicle deck 20 which is disclosed therein for illustrative purposes is comprised of a generally rectangular deck 21; a pair of tubular legs 22 rotatably attached to the lower surface of the deck 21, a generally rectangular upholstered resilient cushion 23 attached to the upper surface of the deck 21 and a means 24 for securing the vehicle deck 20 to the floor 25 of a vehicle 26.

The auxiliary deck 20 is adapted to support the weight of a sleeping occupant and its length and breadth are substantially co-extensive with the length and breadth of the rear cargo area with the rear seat removed such that cargo below the deck 21 is not exposed to view through the windows 27 of the vehicle 26. The auxiliary deck 20 may also be used as a shelf for organizing and transporting articles, such as, clothing, suitcases, and groceries in recreational and utility vehicles.

The deck 21 is preferably a lightweight structural laminate comprised of thin horizontal upper 28 and lower 29 reinforced polyester sheets, a peripheral wall 30, and a rigid cellular core 34 joined to said upper 28 and lower 29 sheets. The peripheral wall 30 is spaced inwardly a small amount from the outer edges of the upper 28 and lower 29 sheets to form a recess 31 for receiving an extruded resilient molding 32 made from a rubber-like material. The resilient molding 32 extends around the periphery of the deck 21 and is adhesively bonded to the upper 28 and lower 29 sheets. In the interior of the deck 21 reinforcements 33 are provided for attaching the legs 22 to the deck 21.

The upholstered cushion 23 which is attached to the upper surface of the deck 21 is slightly larger than the deck 21 so that it may fit snugly in the cargo area. The cushion 23 has a thin flexible outer cover 35 and a resilient cellular inner core 36 and at one end of the cover 35 there is a zipper 37 for the removal and cleaning of the cover 35. The cushion 23 is retained to the upper surface of the deck 21 with conventional hook and loop type fasteners 38.

With reference to FIGS. 4–9, each tubular leg 22 is comprised of a longitudinal lower portion 39, a pair of upward extending vertical portions 40 at the ends of the lower portion 39, a pair of inwardly extending upper longitudinal portions 41 at the ends of the vertical portions 40 and a pair of outwardly extending upper transverse portions 42 at the ends of the upper longitudinal portions 41. The outer ends of the upper transverse portions 42 are covered with small cylindrical caps 43.

The upper longitudinal portions 41 are rotatably attached to the lower surface of the deck 21 with brackets 44. The legs are adjustable outwardly to their operative positions and when the auxiliary deck 20 is not in use, the legs 22 are rotated inwardly whereat the lower 39 and vertical 40 leg portions bear against the lower surface of the deck 21. In the operative positions of the legs 22. The upper transverse leg portions 42 bear against the lower surface of the deck 21. Interposed between the brackets 44 and legs 22, under a slight amount of compression, are insulators 45, made from a rubber-like material. The insulators 45 serve as brakes to maintain the legs 22 in their adjusted positions.

The use of two legs 22 provide several benefits. One benefit is that the legs 22 can be easily adjusted by one person positioned at the rear of the vehicle 26. Another benefit is that they provide a very stable support system for the auxiliary deck 20, particularly when the spacing between the lower longitudinal portions 39 is the same as the spacing between the vehicle's rear wheelhouses 46. In such case, the lower leg portions 39 nest in the corner formed by the intersection of the wheelhouses 26 and the floor 25 and contribute to the support of the auxiliary deck 20.

Figure 2:
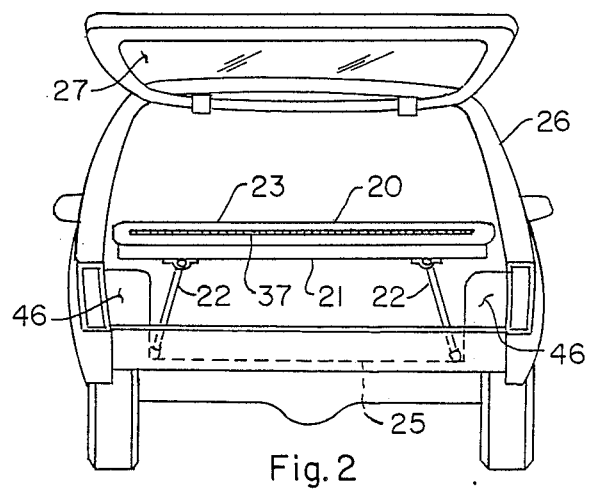
FIG. 2 is a rear view of the vehicle shown in FIG. 1 with its tailgate open and a deck which embodies the present invention in the vehicle's rear cargo space.
Figure 4:
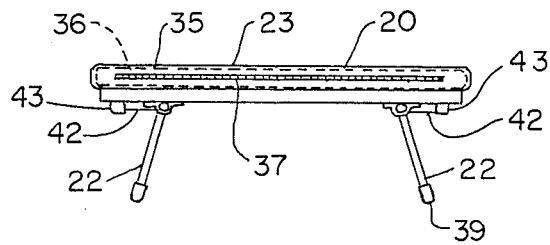
FIG. 4 is a rear view of the vehicle deck.
Figure 5:
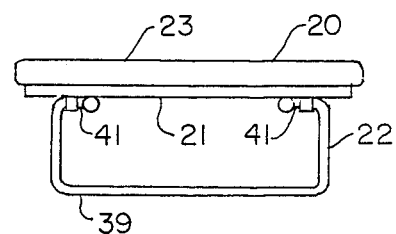
FIG. 5 is a left side view of the deck.
Figure 6:
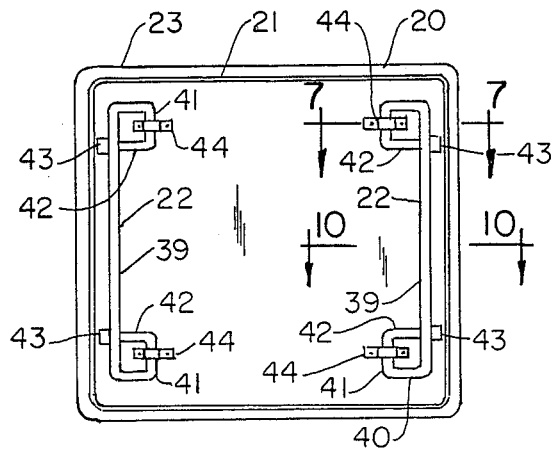
FIG. 6 is a bottom view of the deck.
Figure 7:
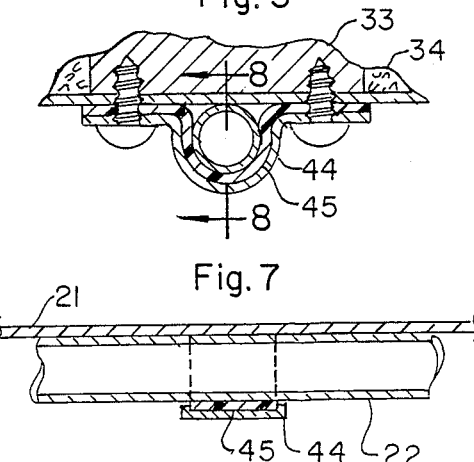
FIG. 7 is an enlarged partial cross-sectional view taken on the line 7—7 of FIG. 6.
Figure 8:
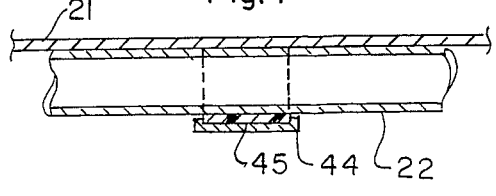
FIG. 8 is a cross-sectional view taken on the line 8—8 of FIG. 7.

In the legs' operative positions, shown in FIG. 2, the legs 22 slope inwardly and the upper transverse leg portions in combination with the lower leg portions 39 support the auxiliary deck 20.

Referring now to FIGS. 13 and 14, the legs 22 of the auxiliary deck 20 are clamped to the vehicle's floor 25 by a pair of tubular brackets 48. Each bracket 48 has an arcuate end portion 49 which conforms to and bears on the upper surface of a lower leg portion 39. At the center of the bracket 48 there is an aperture 50 which receives a J-type hook 51. The J-type hook 51 has an arcuate lower portion 52 which is adapted to a recessed cylindrical floor member 53 and the upper portion of the J-hook 51 is retained to the bracket 48 by a hex nut 55.

With reference to FIGS. 11 and 12, an alternate embodiment 55 is shown therein with deck 59 and a single foldable leg 56. The alternate embodiment 55 is adapted to be installed with a rear seat 58 in place between the front seat 57 and the rear seat 58 of a motor vehicle. The rear seat 58 is used in lieu of a second leg to support one end or the deck 59. The deck 59 and leg 56 are of the same construction as the first described embodiment 20 except for an upward extending recess 60 in the lower portion of the leg 55 to accommodate the shape of the vehicle's floor 61.

From the foregoing it will be appreciated that the present invention provides a lightweight, convenient, easy to use auxiliary deck which can be used for sleeping and shielding cargo from view and as a shelf in utility, recreational and conventional passenger vehicles. Moreover, the deck can be quickly installed and removed from the vehicle and folded into a compact arrangement for storage when it is not in use.

Although but two embodiments of my invention have been described, it will be appreciated that other embodiments can be derived with changes in the material, shape, and arrangement of parts without departing from the spirit thereof.

I claim:

1. An auxiliary vehicle deck assembly including a motor vehicle of the type having a floor, a pair of wheelhouses joined to opposite sides of the floor for enclosing the vehicle's rear wheels, a conventional front passenger seat and a removable rear passenger seat anchored to the floor, and a pair of recessed cylindrical members attached to the floor for releasably anchoring the rear seat to the floor, a generally rectangular thin laminated unitary deck having side margins which extend in the direction of the length of a rear cargo space of said vehicle and front and rear margins which extend in the direction of the width of said cargo space, and having a width which is substantially the same as the width of the rear cargo space and a length which is substantially the same as the length of said rear cargo space when said vehicle's rear seat is detached from said pair of recessed members attached to the vehicle's floor and removed from said vehicle, said laminated deck comprised of spaced apart upper and lower rectangular sheets, a vertical wall spaced slightly inwardly from the outer edges of said sheets to form a recess around the periphery of said deck for a molding, a cellular core between said upper and lower sheets and a resilient molding in said recess extending around the periphery of said deck; a pair of legs rotatably attached adjacent to the opposite side margins of said deck, each of said legs being adjustable about an axis parallel to a side margin of said laminated deck, outwardly away from a stored position adjacent to the underside of said deck to a downward operative position and adjustable inwardly toward said deck to said stored position adjacent to the underside of said deck; a means for rotatably attaching each of said legs to said laminated deck and a means for securing each of the legs to one of said recessed cylindrical floor members.

2. The auxiliary vehicle deck recited in claim 1 wherein each of said legs in said operative position comprises a lower horizontal portion in parallel relationship to the rotational axis of said leg, an upwardly extending portion adjoining each end of said lower horizontal portion, a short first horizontal portion adjoining the upper end of each of said upwardly extending portions, said upper horizontal portion being in parallel relationship to said lower horizontal portion, and a short outwardly extending second upper horizontal portion adjoining the other end of each of the first upper horizontal portions, said in perpendicular relationship to said second horizontal portions.

3. The auxiliary vehicle deck recited in claim 2 wherein the spacing between the first horizontal portions of said legs when said legs are in their downward operative positions is the same as the spacing between the vehicle's rear wheelhouses.

4. An auxiliary vehicle deck recited in claim 1 wherein the upper portion of said deck is resilient.

5. The auxiliary vehicle deck recited in claim 1 further comprising a resilient cushion detachably joined to the uppermost surface of said laminated deck and a means for joining said cushion to said deck.

6. The auxiliary vehicle deck recited in claim 5 wherein said means for joining said resilient cushion to said deck is a hook and loop type fastening means.

7. The auxiliary vehicle deck recited in claim 1 wherein said leg is a tubular leg.

8. The auxiliary vehicle deck recited in claim 1 wherein said means for securing said leg to the vehicle's floor comprises a bracket, said bracket having an arcuate end portion for encircling and clamping said longitudinal lower leg portion to said floor and an aperture at the opposite end portion of said bracket for receiving a J-type hook; a J-type hook having an arcuate lower portion for engaging one of the recessed cylindrical members of said floor, and a means for retaining said J-type hook to said bracket.

9. The auxiliary vehicle deck recited in claim 1 further comprising a friction means for maintaining each of said legs in an adjusted position.

10. An auxiliary vehicle deck for a motor vehicle of the type having a floor and conventional front and rear passenger seats anchored to the floor, comprising, in combination: a generally rectangular thin laminated deck having a width which is substantially the same as the width of a rear seat of a vehicle and a length which is substantially the same as the distance between the back of said rear seat and the back of the vehicle's front seat, said laminated deck comprised of spaced apart upper and lower rectangular sheets, a vertical wall spaced slightly inwardly from the outer edges of said sheets to form a recess around the periphery of said deck for a molding, a cellular core between said upper and lower sheets and a resilient molding in said recess extending around the periphery of said deck; a unitary tubular leg rotatably attached to the underside of the deck which is adjustable about an axis parallel to the forward edge of said deck outwardly away from the underside of said laminated deck to a downward operative position and inwardly to an upward stored position adjacent to the underside of said laminated deck about an axis parallel to the forward edge of said laminated deck, said leg in said downward operative position having a horizontal lower portion in parallel relationship to said rotational axis, an upwardly extending portion adjoining each end of said horizontal lower portion, a short first upper horizontal portion adjoining the upper end of each of said upwardly extending portions, said first upper horizontal portion being in parallel relationship to said lower horizontal portion, and a short second upper horizontal portion adjoining the other end of each of said first upper horizontal portions, said second upper horizontal portions being in perpendicular relationship to said first upper horizontal portions.

* * * * *